United States Patent [19]

Nemirovsky et al.

[11] Patent Number: 4,784,064
[45] Date of Patent: Nov. 15, 1988

[54] DEVICE FOR POSITIONING AN OBJECT

[75] Inventors: Robert Nemirovsky, 11-17 Hyman Ave., Bay Shore, N.Y. 11706; Joseph Deutsch, 5 Jano Pl., Plainview, N.Y. 11803

[73] Assignees: Robert Nemirovsky, Bay Shore; Joseph Deutsch, Commack, both of N.Y.

[21] Appl. No.: 82,307

[22] Filed: Aug. 6, 1987

[51] Int. Cl.⁴ ............................................. B65G 39/18
[52] U.S. Cl. ....................................... 104/135; 104/139
[58] Field of Search ................. 104/75, 134, 135, 139; 193/35 C; 198/345

[56] References Cited

U.S. PATENT DOCUMENTS

| | | | |
|---|---|---|---|
| 922,052 | 5/1909 | Sherk | 104/75 |
| 1,099,952 | 6/1914 | Thurston | 104/75 |
| 3,666,076 | 5/1972 | Miller et al. | 198/345 |
| 4,014,428 | 3/1977 | Ossbahr | 198/345 |
| 4,095,687 | 6/1978 | Shoiket | 198/345 |
| 4,148,400 | 4/1979 | Cross | 198/345 |
| 4,201,284 | 5/1980 | Brems | 198/345 |
| 4,494,282 | 1/1985 | Ida et al. | 198/345 |
| 4,534,546 | 8/1985 | Cattani | 198/345 |
| 4,583,631 | 4/1986 | Yonezawa et al. | 198/345 |
| 4,687,091 | 8/1987 | Sticht | 198/345 |

OTHER PUBLICATIONS

Catalog: Iko LRM CAT-5716.

Primary Examiner—George L. Walton

[57] ABSTRACT

A device for moving or positioning an object makes use of a track on a base and a circular groove on the platform. The platform holds the object. Balls are captured between the platform and the base which permit independent translation and rotation of the platform with respect to the base, by the simultaneous rolling and sliding of the balls. A mechanism for preloading and interlocking the base and the platform is also provided. The mechanism includes a shaft passing between the platform and the base and two channels formed in the platform. Elements disposed in the channels urge the shaft in opposite directions or selectively locking and disengaging of the platform and the base.

17 Claims, 2 Drawing Sheets

DEVICE FOR POSITIONING AN OBJECT

BACKGROUND OF THE INVENTION a. Field of Invention

This invention pertains to a device for positioning an object and more particularly for the movement of an object along a preselected linear or curved path defined on a stationary member and for rotation about an instanteneous axis perpendicular to the path. The method and device are particularly suited for a smooth, uninterrupted transition from linear to curvilinear motion. A locking mechanism for the device is also disclosed.

b. Background of the Invention

It is often necessary to position certain objects in preselected locations and orientations by translating the object along a path and/or rotating the object along an axis generally perpendicular to the path. Frequently this positioning must be accomplished with great precision so that it can be repeated very accurately as many times as desired. Such objects include lasers for example which are frequently moved in a reciprocating action.

Devices are known in the art which allow the translation of an object along a linear track. For example, three types of such device, generally known as slides, are described in publication No. 0886 by the DAEDAL Corporation of Harrison City, Pennsylvania, entitled "State-of the Art Positioning Equipment", pages 7,8,10,11,13–41, namely the dovetail, the ball and cross-roller slide. However, these devices are rather complicated and expensive. Furthermore these cannot be used for translating an object along both a linear and curved track.

Devices are also known for rotating objects, such as the Rotary Motion-Positioning Tables shown on pages 43–49. However these devices cannot be used for translation. For example Model 4575 is claimed to be a compact unit, but it is in fact a two-stage device. Up till now if an object has to be translated and rotated two stage devices, one stage for each kind of motion, had to be used.

Other devices for positioning objects are found for example in Klinger Scientific Short form Catalog/87, 110-20 Jamaica, N.Y. 11418-9970, page 3 also shows stacking of separate stages. Other devices are found in Klinger Scientiic Catlog 584 C pages 1–92, Catalogs LRW (CAT-5716) and LWM (CAT-5715) available from IKO International, Inc. 68-F Chapin Road, Pine Brook, N.J. 07058. The devices shown therein have the same defficiencies as the DAEDAL devices described above.

In view of the above, there is need for a cost efficient, reliable, durable positioning device which is easy to manufacture.

SUMMARY OF THE INVENTION

Briefly, a device for positioning objects in accordance with the invention comprises a base on which a path is defined for translation, a platform for holding translating and rotating the object, said platform including platform groove means facing said path, and coupling means disposed between the base and the platform. The coupling means includes bearing means rotatably disposed between said base and platform track means.

Rolling and slipping of the bearing means between the tracks provides for a method of independent or combined translation and rotation of the object mounted on the platform. An important advantage of the invention is that it has only one platform for both motions.

The subject method and device provide a simple, smooth, rigid and stable means of positioning an object which is quite precise while subjected to loads and moments in all directions. Compared to other similar devices and methods, the subject invention provides practically unlimited linear and/or curved low friction motion and rotation with high precision.

The invention also allows the use of conventional manual or motor-driven mechanisms as locomotion means. Therefore it is well suited for a large range of applications including: optical and automated positioning equipment; metal, wood or plastic working machining centers or lathes used for milling, cutting, punching and grinding materials; industrial and commercial robots; medical equipment; toys; and other mechanisms requiring translation, rotation or a complex combination of both.

Preferably the elements of the device should be pre-loaded to eliminate play therebetween. This pre-loading as well as locking the device in a preselected position may be accomplished by any conventional means. Preferably an innovative pre-loading and adjusting mechanism is used in which a force is generated in a direction generally along to the axis of rotation of the platform between a ball supported by the platform and a curved surface formed on a coupling member extending between the platform and the base. The ball, handle and coupling member being constructed and arranged to generate a significant clamping force in response to a small turning of the handle. This mechanism eliminates undesirable displacement forces between the elements of the positioning device, does not require any mounting space on the top platform surface, it is very durable, since some wear between the ball and the curved surface, practically does not change its performance.

DETAILED DESCRIPTION OF THE INVENTION

One important advantage of the present invention is that its operation is completely independent of its orientation and therefore terms such as up, down, top or bottom are in conjunction with the drawings only to facilitate the description and are not to be interpreted as limitations on the scope of the invention.

Figure 1:
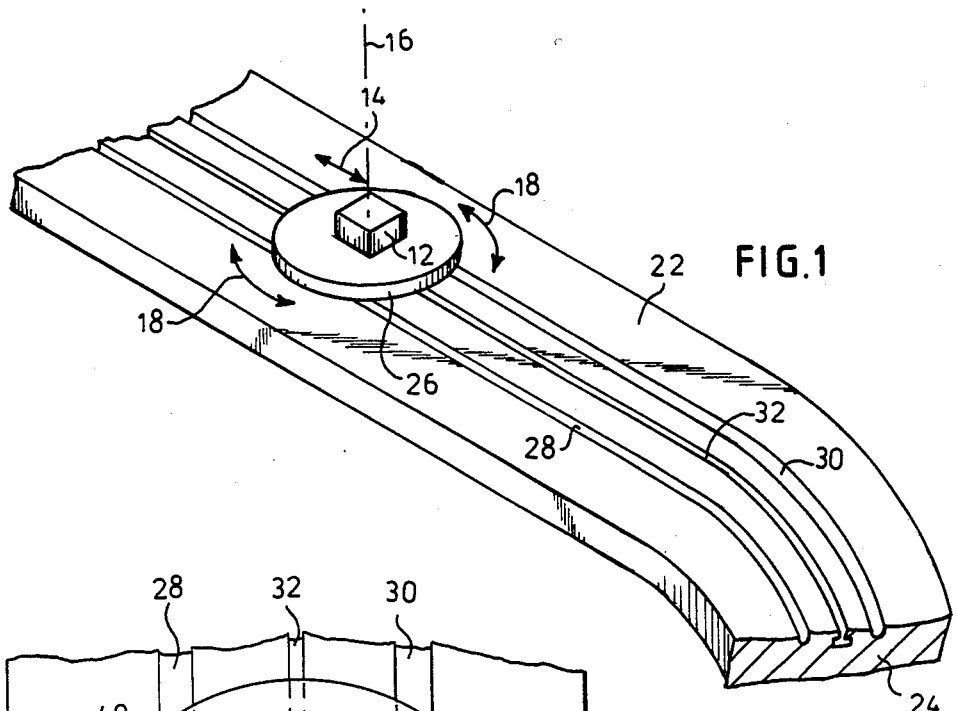
FIG. 1 shows a perspective view of a device for positioning an object constructed in accordance with the invention.
Figure 2:
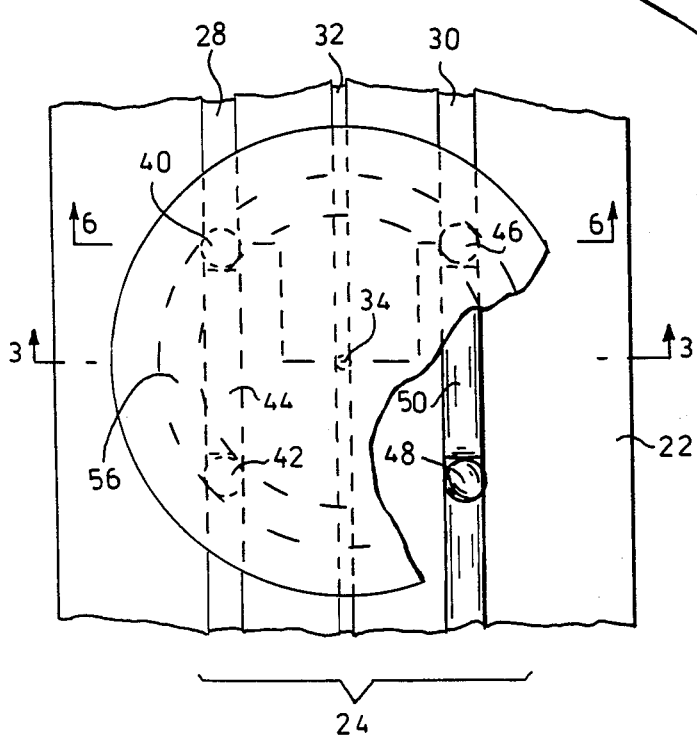
FIG. 2 shows a plan view of the device of FIG. 1.
Figure 3:
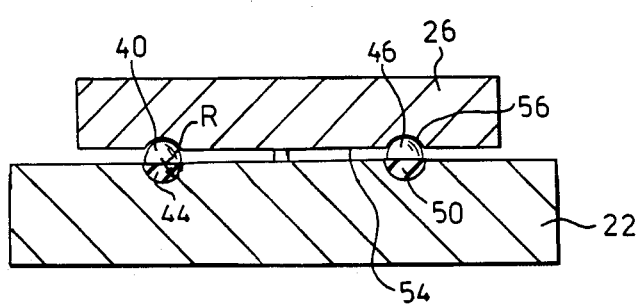
FIG. 3 shows a cross-sectional view of the support surfaces and the coupling members taken along line 3—3 of FIG. 2.
Figure 4:
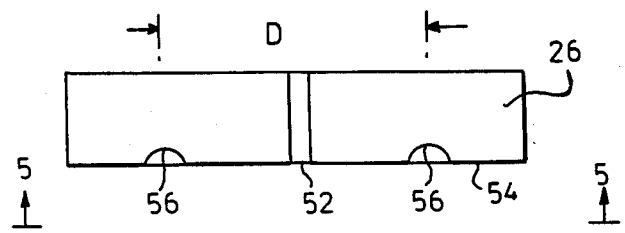
FIG. 4 shows a cross-sectional view of the platform of FIG. 1.

Refering now to the drawings, FIG. 1 illustrates a device for positioning an object 12 mounted on a platform 26, by translation along the direction shown by a first arrow 14 and/or rotation around an axis 16 as indicated by a second arrow 18. As shall become apparent from the description, the device allows the translation and rotation to be performed completely independently of each other so that they can be done in any sequence or even simultaneously.

Device 10 includes a base 22 on which there is formed a track 24. Track 24 defines the path of translation along direction 14. The device also includes a platform 26 which is coupled to the track 24, as described below. Base 22 and platform 26 can have any required shape - round, square, rectangualar and so forth. Platform 26 is provided with various screw holes and other similar means on its top surface which allow object 12 to be mounted securely to the platform and which have been omitted from the drawings for the sake of clarity. The platform 26 can rotate around axis 16.

Figure 5:
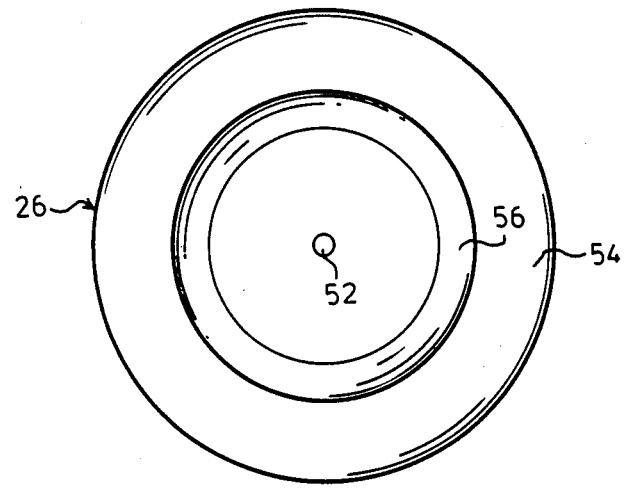
FIG. 5 shows a bottom surface of the platform of FIG. 4 facing the track.

The track 24 and some of the coupling elements are shown in FIGS. 1-5. As can be seen from the Figures, track 24 includes two grooves 28, 30, traversing surface 22. The grooves have identical cross-sections, preferably in the shape of section of a circle having a radius R. Referring to FIGS. 1, and 5, platform 26 has a through hole 52 and a bottom face 54. On this bottom face there is a circular groove 56 with a diameter D which is concentric with hole 52. Groove 56 has also a cross-section shaped as a section of a circle with radius R. Disposed on grooves 28 and 30 there are four balls 40, 42, 46 and 48 having a radius R. The depth of grooves 28, 30 and 56 is preferably 3-5% less than radius R to provide proper clearance between the base and the platform. The distance between the center lines of grooves 28 and 30 is preferably in the range of 60-70% of D.

Between the balls 40, 42 and 46,48 there are provided spacers 44 and 50. These spacers have the shape of a section of a semicylinder with a radius R. The purpose of bar 44 is to maitain a preselected constant spacing between balls 40,42 and 46,48 respectively. Platform 26 is disposed on the base so that the balls are captured between the base grooves and the platform groove.

Between grooves 28 and 30 there is a T-slot 32. A conventional locking mechanism may be installed in the T-slot and through hole 52 for pre-loading and locking the device. Pre-loading provides a uniform coefficient of friction and eliminates sideplay and backlash during translation and rotation. The lubricant may be applied to the grooves and the balls to insure a smoother operation thereof. The abovedescribed device provides for a method of moving or positioning objects which is very precise. Furthermore the same method and device can be used to move or position relatively large loads. For example with a device having a circular platform with a 4½ in diameter mounted on a track 2¼ in wide (center to center) and ½ in balls could easily rotate or translate a load of 200-300 lbs.

The various elements described above can be made of various materials, depending on the particular application. For large loads, and very precise positioning, the elements should be machined of high strength steel. For relatively light loads, and application where very precise positioning is unnecessary, relatively inexpensive high impact plastic materials may be used.

To increase the load capacity of the device a double track may be provided on the base and two concentric grooves may be provided on the platorm. In this high-load configuration eight balls for may be used.

If track 24 is straight, spacers 44, 50 could be made relatively rigid and of equal length. If track 24 has a variable curvature, flexible spacers 44, 50 should be used. If track 24 is circular, relatively rigid spacers can be used having different lengths determined by the radius of the path and the distance between the base grooves.

Figure 6:
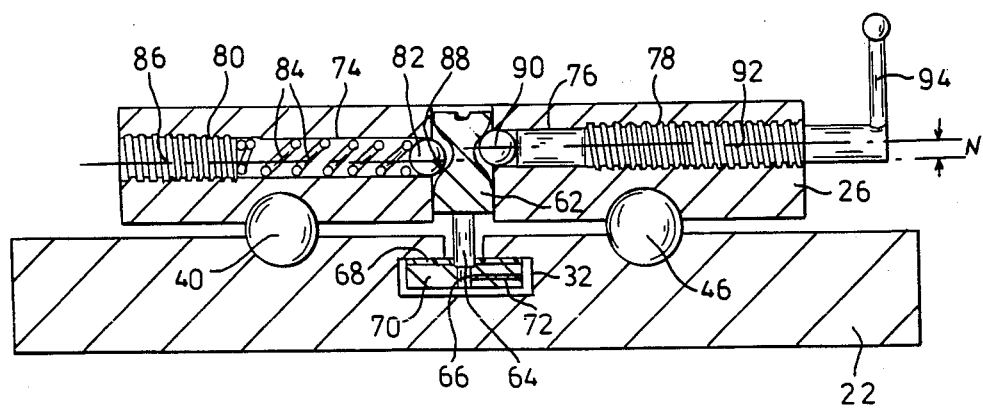
FIG. 6 shows a cross-sectional view of the device in accordance with the invention taken along line 6—6 of FIG. 2 with pre-load adjusting and a locking mechanism.

A somewhat preferred mechanism for pre-loading and locking the device 10 is shown in FIG. 6. The mechanism consists of a shaft 62 whith two opposed ends 64 and 66. End 66 is threaded and is secured to a threaded not 70 by two screw stoppers 72 only one of which is shown in FIG. 6 for clarity. Nut 70 is disposed in T-slot 32 of base 22, with a wave spring washer 68 disposed on top of the nut, concentrically with respect to shaft end 64. The spring washer 69 provides initial preloading between the base 22 and the platform 26.

Platform 26 is provided with two radial channels 74 and 76. Channel 76 is axially offset from channel 74 by a distance N. Both channels 74 and 76 have a threaded portion 78 and 80 respectively. In channel 74 there is a ball 82, spring 84 and a threaded plug 86. In the vicinity off the channels, the shaft is profiled with a curved surface as at 88. The spring 84 acting on ball 82 generates a tangential and axial force on shaft 62 in the downward direction. This force releases the platform 26 from engagement with the base 22, with only the initial pre-loading therebetween provided by the spring washer 68. With the platform 26 in a released state, it is free to move along the track 24 of the base 22.

Channel 76 is provided with a second ball 90 (preferably identical to ball 82) and a threaded pushing stud 92 engaged by the threaded portion 78 of the channel. Stud 92 is terminated with a handle 94 which, when turned in a direction which urges ball 90 toward shaft 62, generates a relatively large clamping force directed axially between the platform 26 and the base 22 causing the members to lock together. It is sufficient to turn the handle by only 20-25 degrees to achieve full locking of the device.

Satisfactory performance may be achieved with above-described mechanism even if channel 74 with related ball 82, spring 84 and plug 86 are omitted. The channels 74 and 76 and their elements insure locking between the platform 26 and the base 22,and can be used without pre-loading elements 68, 70 and 72 for locking only of any two parts. In this case threaded part 66 if a bushing, which then is only a bearing for the locking mechanism. If space is available, under base 22 T-slot 32 may be replaced by a through-slot. In this arrangement a pre-load adjusting mechanism or a bearing of a locking mechanism can be disposed under the base.

Obviously numerous modifications may be made to the invention without departing from its scope as described in the appended claims.

What is claimed is:

1. A device for independent translation and rotation of an object comprising:
   a. base means with a first set of groove means defining a translation path for the object;
   b. platform means for holding said object, said platform means including a second set of groove means facing said base means for defining an axis of rotation for the object; and
   c. single coupling means disposed between said base and said platform means, said coupling means including rolling ball means which are continuously and directly engaged between said first and said second set of groove means, which rolling ball means simultaneously roll and slide for a translating motion of said platform means along said path and independently rotating said platform around said axis.

2. The device of claim 1 further comprising interconnecting means extending between said base and said platform means for selectively interlocking said platform and said base means when said platform is in a preselected position.

3. The device of claim 2 wherein said interconnecting means includes preloading means for eliminating play between said base and said platform means.

4. The device of claim 1 wherein said platform groove means comprises a circular platform groove.

5. The device of claim 4 wherein said grooves have a cross-sectional shape of a section of a circle of radius R.

6. The device of claim 5 wherein said coupling means comprises a plurality of balls captured between said base and platform grooves.

7. A device for positioning an object comprising:
 a. a base with a first and a second base groove for defining a translation path;
 b. a platform with a circular platform groove defining an axis of rotation facing said base grooves; and
 c. a plurality of balls continuously and directly engaged between said base grooves and said platform groove which balls roll and slide simultaneously within said grooves for translating said platform along said path and for independently rotating said platform about said axis.

8. The device of claim 7 further comprising interconnecting means extending between said platform and base for selectively interlocking thereof.

9. The device of claim 8 wherein said interlocking means comprises a shaft colinear with said axis, a spring washer for preloading said platform with respect to said base and securing means for mounting said washer on said shaft.

10. The device of claim 8 wherein said plurality of balls is equal to four, two balls for each base groove.

11. The device of claim 10 further comprising spacers between said balls slidably disposed in said grooves.

12. The device of claim 11 wherein said path is linear and wherein said spacers have equal lengths, and are rigid.

13. The device of claim 11 wherein said path is circular and said spacer are rigid and have unequal lengths.

14. The device of claim 11 wherein said path has variable curvature and said spacers are flexible.

15. The device of claim 11 wherein said spacers are semicylindrical, said grooves have a cross-sectional shape of a section of a circle, said plurality of balls, said spacers and said grooves having a radius R.

16. The device of claim 7 wherein said base further comprises third and fourth base grooves arranged in parallel with said first and second base groves, said platorm comprises a second circular platform groove, and said balls are captured between said base grooves and said platform grooves.

17. A device for independent translation and rotation of an object comprising:
 a. base means with a first set of groove means defining translation path for the object;
 b. platform means for holding said object, said platform means including a second set of groove means facing said base means for defining an axis of rotation for the object; and
 c. single coupling means disposed between said base and said platform means, said coupling means including sliding means which are continuously and directly engaged between said first and said second set of groove means, which sliding means slide for a translating motion of said platform means along said path and for independently rotating said platform around said axis.

* * * * *

UNITED STATES PATENT AND TRADEMARK OFFICE
CERTIFICATE OF CORRECTION

PATENT NO. : 4,784,064

DATED : November 15, 1988

INVENTOR(S) : Robert Nemirovsky,

It is certified that error appears in the above-identified patent and that said Letters Patent is hereby corrected as shown below:

Title page:

DELETE "Joseph Deutsch, 5 Jano Pl., Plainview, NY 11803" from the list of inventors.

Signed and Sealed this

Sixteenth Day of October, 1990

Attest:

HARRY F. MANBECK, JR.

*Attesting Officer*     *Commissioner of Patents and Trademarks*